United States Patent [19]

Schneider et al.

[11] 4,414,455
[45] Nov. 8, 1983

[54] METHOD OF AND APPARATUS FOR PRODUCING CAN BODIES WELDED ALONG THE LONGITUDINAL SEAM

[75] Inventors: Franz Schneider; Walter Panknin, both of Göppingen, Fed. Rep. of Germany; Zèlimir Belamaric, Marin; Fred Schalch, Le Landeron, both of Switzerland

[73] Assignee: L. Schuler GmbH, Goeppingen, Fed. Rep. of Germany

[21] Appl. No.: 233,866

[22] Filed: Feb. 12, 1981

[30] Foreign Application Priority Data

Feb. 12, 1980 [DE] Fed. Rep. of Germany ....... 3005083

[51] Int. Cl.³ ............................................ B23K 11/06
[52] U.S. Cl. ..................................... 219/64; 219/108; 219/117.1
[58] Field of Search .............. 219/59.1, 64, 108, 117.1

[56] References Cited

U.S. PATENT DOCUMENTS 3,542,992 11/1970 Sennello ................................ 219/64
3,553,567 1/1971 Pesce et al. .
3,632,949 1/1972 Thorne ................................. 219/64

FOREIGN PATENT DOCUMENTS 1180979 2/1970 United Kingdom .

Primary Examiner—C. C. Shaw
Attorney, Agent, or Firm—Craig & Burns

[57] ABSTRACT

In conventional methods for welding can bodies along their longitudinal seams, high frequency substantially rectangular a.c. currents are used for the welding current to avoid the problem of arcing found in d.c. welders. However, the high frequency a.c. current causes an undesirable degree of heating which produces eddy currents and necessitates cooling equipment. To overcome this problem, a method of producing can bodies welded along their longitudinal seam is provided in which the length of a half wave of the substantially rectangular welding current is matched in length and concurrent with the amount of time required for a can body to pass between the welding electrodes.

15 Claims, 5 Drawing Figures

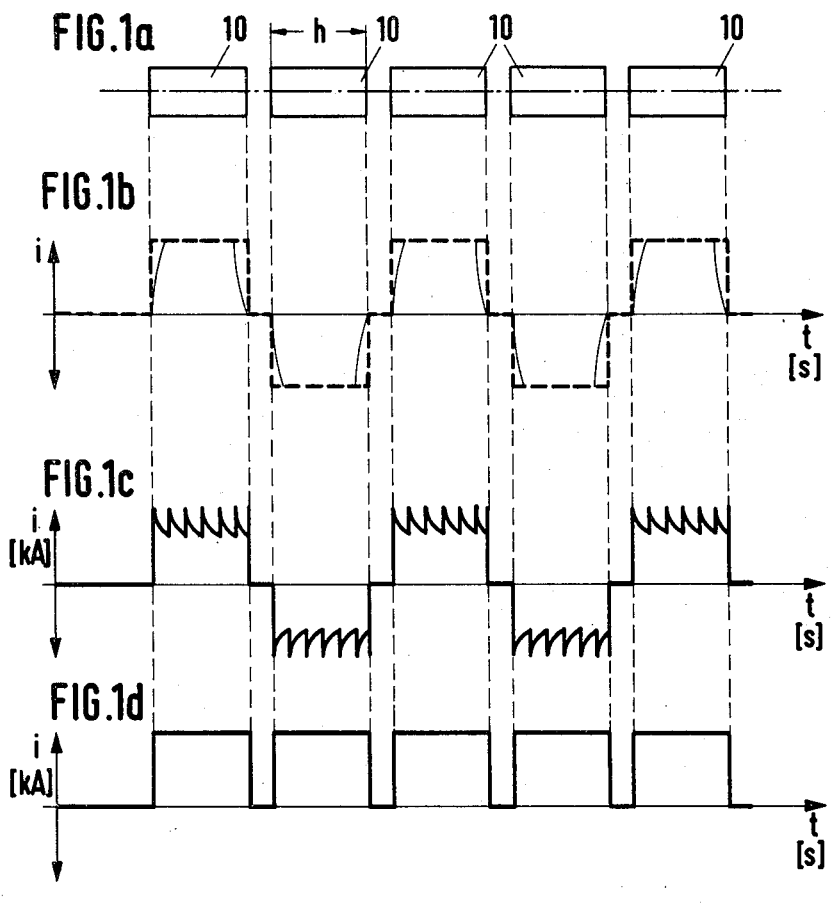
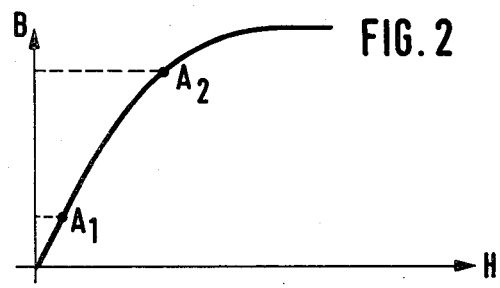

METHOD OF AND APPARATUS FOR PRODUCING CAN BODIES WELDED ALONG THE LONGITUDINAL SEAM

FIELD OF THE INVENTION

The invention relates generally to a method of producing can bodies, and more particularly to a method of manufacturing rounded can bodies, welded along a longitudinal seam on a resistance welding apparatus in which overlapping portions of the can bodies are passed through a pair of opposed pressure-roller electrodes and are continuously welded together, whereby the electrodes are connected to a source of electric energy by way of connecting means and the electric energy source generates a substantially rectangular welding current waveform in the welding-electrode rollers.

BACKGROUND OF THE INVENTION

Sources of current are employed for fabricating rounded can bodies welded along the longitudinal seam and which generate an intermittent or periodic, nearly rectangular current in the pressure-roller electrodes are known in the prior art, as exemplified by West German Offenlegungsschrift No. 16 13 730 (U.S. Pat. No. 3,553,567) and Swiss Pat. No. 483 292 (British Pat. No. 1,180,979). To obtain a weld of the highest quality, alternating current pulses are utilized which have a higher frequency than the standard line or power network frequency. By using an alternating current, the danger of arcing which occurs in d.c. welding and the resultant destruction of the seam to be welded can largly be avoided. However, the use of a higher-frequency alternating current requires a considerable expenditure in circuitry, e.g., for the control of the start and end of the welding operation and for the control of the welding power to be used. However, another important disadvantage of the prior art welding processes which use a higher-frequency welding current is to be seen in the heating of the resistance welding apparatus which is caused by eddy currents. In addition to the electrical losses resulting therefrom, a non-negligible expenditure and technical effort is needed to cool the resistance welding apparatus, with the result that its efficiency is still further reduced. Additionally, in most resistance welding apparatus, special antimagnetic materials must be employed for many components in order to keep the eddy-current induced heating within controllable bounds.

SUMMARY OF THE INVENTION

Accordingly, it is an object of the present invention to provide a process for manufacturing rounded can bodies welded along a longitudinal seam, while avoiding the drawbacks of the prior art welding processes, by means of which a continuous welding seam free of interruptions can be achieved whereby a synchronization of the start and end of the welding operation is possible.

These objects are achieved in accordance with the present invention by matching the length or duration of a half wave of the nearly rectangular welding current to the time a can body is passed between the pressure-roller electrodes.

Utilizing the process of the present invention, heating of the resistance welding apparatus caused by inductive eddy currents is largely avoided. A continuous weld is obtained so that one make speak of a quasi d.c. welding in the a.c. welding process according to the present invention since the length or duration of a half wave of the welding current corresponds exactly to the welding time of a can body.

Since it is possible to superimpose a higher-frequency current component upon the nearly rectangular welding current, the energy which is required during the welding operation, which is a function of various factors such as the delivery rate of the can bodies, the thickness of the plates to be welded, etc., can be controlled directly.

BRIEF DESCRIPTION OF THE DRAWINGS

The invention will now be described with reference to the accompanying drawings, in which:

FIG. 1a shows a number of rounded can bodies which are conveyed at a predetermined rate;

FIG. 1b shows the waveform of a welding current synchronous with FIG. 1a;

FIG. 1c shows the waveform of a welding current synchronous with FIG. 1a and having a superimposed higher-frequency current component;

FIG. 1d shows the waveform of a welding current synchronous with FIG. 1a without polarity reversal; and FIG. 2 shows a characteristic curve of a welding transformer in a B/H diagram.

DETAILED DESCRIPTION OF THE PREFERRED EMBODIMENTS

FIG. 1a shows rounded can bodies 10, e.g., can bodies which are passed at a predetermined rate between pressure-roller electrodes of a resistance welding apparatus (not shown) and are welded together along their longitudinal seam. As soon as a can body 10 is passed between the pressure-roller electrodes, the welding current i is started. It reaches its maximum amplitude in a short time, that is to say, with a small time constant, and now remains nearly constant during the time the can body is passed between the welding electrodes. The welding current i is cut off precisely at the end of the welded can body 10. The beginning of the next can body 10 causes the welding current i to be turned on again, but with reversed polarity. The welding operation, as described takes place hereinabove, again as a result of a nearly constant current pulse, the duration of which corresponds exactly to the time during which the can bodies 10 are passed between the pressure-roller electrodes. Thus, with the method of the present invention, an a.c. resistance welding results with a welding-current frequency which is proportional to the delivery rate of the can bodies and to the length of the can body.

The welding current i in FIG. 1b shows a rectangular shape. By controlling the time constant of the welding circuit respectively the magnitude and form of the voltage, the slope (which is to be understood as the change of current per unit of time) can be determined.

To illustrate this with an example, if the deliverly rate is $v_1 = 50$ m/min and the height of the can body is $h = 125$ mm (corresponding to a 1-kilogram can) and if the distance between the can bodies is disregarded, then 6.67 can bodies per second are passed between the pressure-roller electrodes. Thus, the frequency of the welding current i which a welding transformer must transfer from a source of electric enegy at full welding power output is $f_s = 3.3$ Hz.

Since, normally, on a resistance welding apparatus, different heights of can body must be processed, another example will be given. If a delivery speed is $v_2=50$ m/min and a can-body height is $h=210$ mm, then 3.97 can bodies per second are passed between the pressure-roller electrodes. Hence, it follows that under the same conditions as in the previous example the frequency of the welding current i is $f_s=2$ Hz.

By superimposing a higher-frequency current component on the low frequency a.c. welding current, as shown in FIG. 1c, the regulation of the energy fed to the welding spot which, as is known, is proportional to the square of the amplitude of the welding current i, is possible.

FIG. 1d shows a welding current having no polarity reversal, so that half waves with the same polarity succeed one another.

A corresponding design of a welding transformer respectively measures for the de-energization during the welding pauses, i.e., during the non-welding periods, permit a welding current i as discussed above. The modifications described above for controlling the current shape and the modulation with higher-frequency current components are likewise possible using known modulation and rectification techniques.

In order to make use of this method, an important precondition lies in designing an associated welding transformer such that the lower transferable limit frequency can be selected to be very low without changing the power transfer. In the above example, the lower limiting frequency of the welding current amounts, on the one hand, to $f_s=3.3$ Hz and, on the other hand to $f_s=2$ Hz. However, as shown in FIG. 2, these extremely low frequencies can be obtained in a welding transformer only when the working point $A_1$ on the magnetic characteristic curve is chosen so low that operation outside the saturation range is assured (e.g., in FIG. 2 this is shown as a value below $A_2$).

The rapid rise of the welding current i mentioned above is achieved by reducing the time constants or the magnitude and form of the voltage, which causes the rise of the welding current according to an e-function in conformity with known principles. As is known, the time constant results from the ratio of the sum of the inductive reactances to the sum of the ohmic resistances in an equivalent circuit diagram of a welding circuit. By reducing the effective inductances, e.g., by arranging the current-carrying conductors, etc. as concentrically as possible, the time constant is effectively reduced.

In the majority of applications, it is a great advantage if the rate of rise and decay of the welding current can be controlled by means of the steps described above. In this way, during the welding of a can body 10 and at the end of the welding operation the welding of a faulty can body 10 can effectively be avoided, since imperfections are prevented by too rapid a rise (which can cause spraying of the material) or by a belated decay (which can cause the creation of a protruding weld bead) of the welding current. By strictly controlling the start and end of the welding operation and the rate of rise and decay of the welding current i, it is possible to reduce the can-body spacing in the region of the pressure-roller electrodes to almost zero.

Thus, on the basis of the foregoing discussion, it can be stated that the method according to the invention permits a favorable combination of the advantages of a.c. resistance welding with those of d.c. resistance welding.

It is to be understood that the above-described arrangements are simply illustrative of the application of the principles of this invention. Numerous other arrangements may be readily devised by those skilled in the art which embody the principles of the invention and fall within its spirit and scope.

We claim:

1. A method of making can bodies welded along a longitudinal seam on a resistance welding apparatus which includes a source of electric energy operable to produce nearly rectangular pulses of welding current and a pair of opposed welding electrodes operatively connected with said source so that overlapping portions of the can bodies are continuously welded as they are passed through said pair of electrodes, comprising the steps of controlling the duration of a half wave of a nearly rectangular welding current pulse in such a manner that it is matched to the time required for a given can body to pass between said welding electrodes, and reversing the polarity of the nearly rectangular welding current pulses from one can body to the next can body.

2. A method according to claim 1, further comprising the step of controlling the time contant which determines the rise and decay of said welding current pulses.

3. A method according to claim 1, further comprising the step of controlling the rate of rise and decay of said welding current when the time constant for the welding current pulses is predetermined.

4. A method according to claim 1, further comprising the step fo superimposing a higher-frequency current component upon said nearly rectangular welding current pulses.

5. A method according to claim 1, wherein the welding electrodes comprise an opposed pair of pressure-roller electrodes.

6. A method according to claim 1, wherein the source of electric energy includes a transformer having a sheeting of magnetically soft material, comprising the steps of designing the transformer for a low limit frequency of power transfer, which is determined essentially by the ratio of delivery velocity to length of the can bodies, and dimensioning the sheeting of magnetically soft material in a manner enabling determination of the working point along its magnetic characteristic curve in the B/H diagram of the transformer, which is located at the beginning of the linear area thereof.

7. A method according to claim 6, characterized in that in said welding transformer the sum of the effective inductances is set as a value, greater than zero, to establish a time constant for the welding current so that the welding current remains substantially constant during the time the can body passes through the welding electrodes.

8. A method according to claim 6, further comprising the step of controlling the time constant which determines the rise and decay of said welding current pulses.

9. A method according to claim 6, wherein comprising the step of controlling the rate of rise and decay of said welding current when the time constant for the welding current pulses is predetermined.

10. A method according to claim 6, further comprising the step of superimposing a higher-frequency current component upon said nearly rectangular welding current pulses.

11. An apparatus for producing can bodies with a continuous, longitudinal welding seam in the area of overlapping portions of the can bodies, comprising means forming a source of electrical energy operable to produce nearly rectangular welding current pulses including a transformer, a pair of opposed welding electrode means electrically connected to said source, means for passing respective can bodies through said pair of electrode means to weld together overlapping portions in a continuous longitudinal welding seam as the respective can bodies pass through said pair of electrode means, control means including first means for controlling the duration of a half wave welding current pulse to be matched to the time required for a given can body to pass through said pair of electrode means and second means for reversing the polarity of the welding current pulses from one can body to the next can body.

12. An apparatus according to claim 11, further comprising means for superimposing a higher-frequency current component on said welding current pulses.

13. An apparatus according to claim 11, wherein said transformer is designed for a lower transferable limit frequency which is determined essentially by the ratio of feed velocity to length of the can bodies, said transformer including a sheeting of magnetically soft material of such dimensions as permits a determination of the working point on the magnetic characteristic curve in the B/H diagram thereof which is located in the area of the beginning of its linear range.

14. An apparatus according to claim 13, wherein the sum of all effective inductances is greater than zero but relatively small.

15. An apparatus according to claim 14, further comprising means for superimposing a higher-frequency current component on said welding current pulses.

* * * * *